Figure 1:
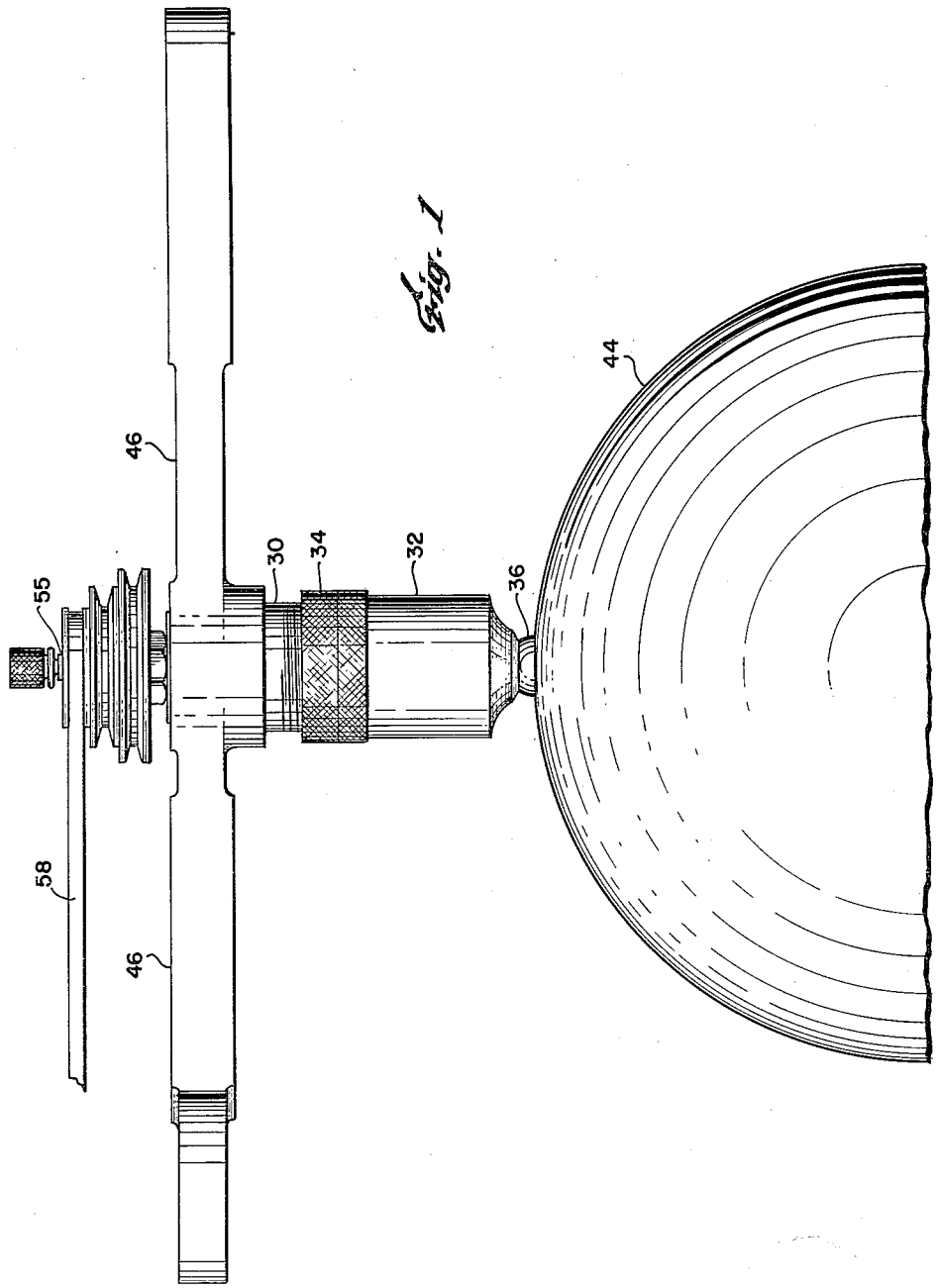

Nov. 12, 1963     L. J. DIONNE     3,110,226
DEPTH CONTROL DEVICE FOR CUTTING MACHINE

Filed Aug. 1, 1960     2 Sheets-Sheet 1

Leonard J. Dionne
Inventor
by Porter, Chittick + Russell
Attorneys

Leonard J. Dionne
Inventor
by Porter, Chittick & Russell
Attorneys

United States Patent Office 3,110,226
Patented Nov. 12, 1963

3,110,226
DEPTH CONTROL DEVICE FOR CUTTING MACHINE
Leonard J. Dionne, Westwood, Mass., assignor to Green Instrument Company, Cambridge, Mass., a corporation of Massachusetts
Filed Aug. 1, 1960, Ser. No. 46,803
4 Claims. (Cl. 90—62)

This invention relates to engraving machines and other cutting tools and more particularly to a device for controlling the depth of engraving or cutting done with said machines on work pieces having essentially smooth curved surfaces such as convex, concave, or inclined surfaces. Previous depth control devices have had certain disadvantages, and the object of my invention is to correct deficiencies by providing for uniform depth and large areas of engraving upon curved surfaces.

Depth control devices used on engraving machines are customarily of two types: (1) a shoe with a central hole in it located on the axis of rotation of the spindle of the engraver. The shoe and spindle are locked together, and the spindle can rise and fall to follow the contour of the work piece. The shoe rides on the work piece, and the engraving cutter protrudes through the hole in the shoe. The shoe can be adjusted so that more or less of the cutter protrudes. This system provides a fairly good method of depth control as long as the radius of the curved work piece is large and the engraving is done over only a small area on the highest part of the surface of the work piece. However, as the spindle is moved away from the high point, the shoe rides on only one side, thus preventing the cutter from engraving as deep as at the high point, and finally there will be no engraving at all. (2) A second development of the depth regulator has the shoe mounted in gimbals so that it can pivot as the spindle moves away from the high point of the work piece. This device is superior to the first device explained above, but since the pivots of the gimbals must be above the work surface, the depth of cut still varies, and to get the pivots as close as possible to the work surface, they have to be made very small and are therefore much too delicate to be practical. I have, therefore, sought to overcome the defects, limitations, and disadvantages of these earlier devices.

My new depth control device corrects the deficiencies in the older devices by making the nose of the shoe pivot so that it is always tangential to the convex surface work piece. This is done by providing a detachable hollow frame member or shoe secured to the spindle mounting of the engraving machine, the lower end of which forms a socket having a hemispherical inner contour which receives a nose piece of hemispherical contour and which is pivotally mounted therein. The nose piece has a central orifice therein, tapered outwardly, through which the cutting tool protrudes. The pivot point of the nose of the shoe lies on the axis of rotation of the spindle and cutter, and also upon the surface of the work piece. Thus, the depth of engraving is uniform and the work area on a curved surface is large. Further, the nose piece is retained for pivotal movement in the socket by means of magnetic attraction, one of the parts being magnetized and the other of magnetic material.

Figure 2:
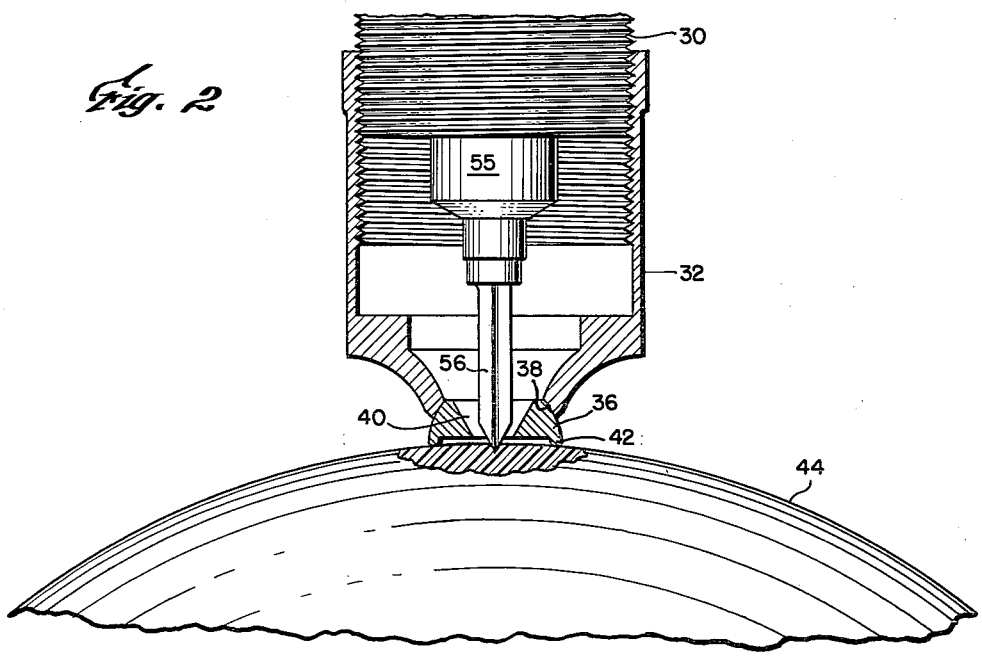
Figure 3:
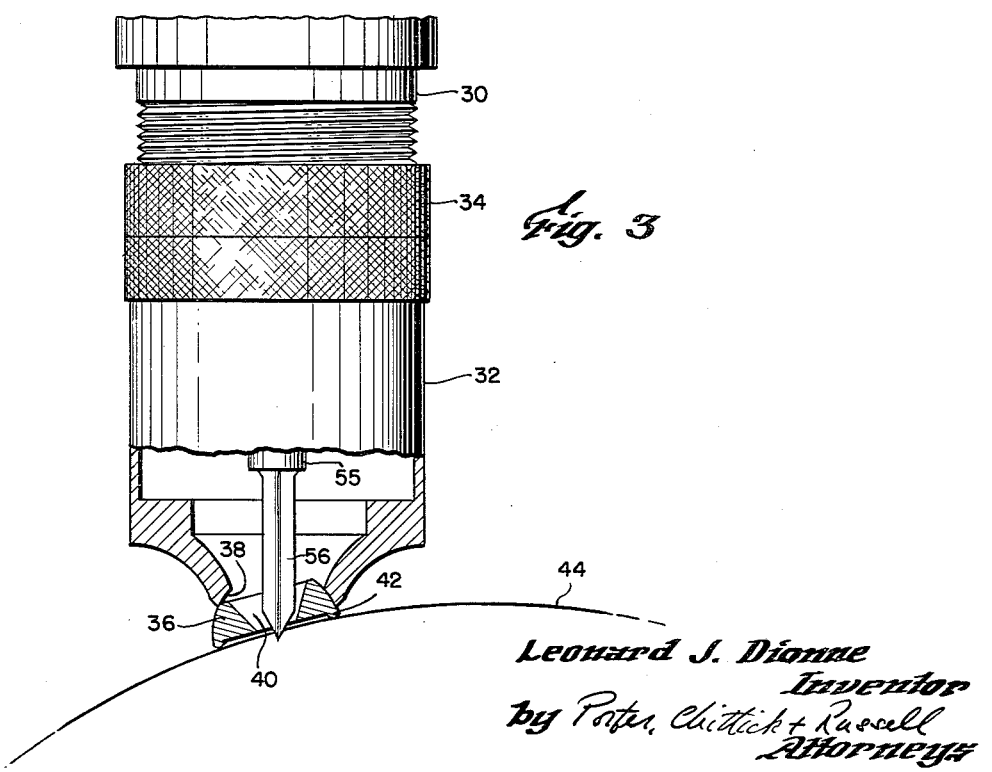

The improvements and advantages of my cutting depth control device for engraving machines will appear in the following specification and accompanying drawings in which:

FIG. 1 is a side elevation of my depth control device;
FIG. 2 is a vertical section at the high point of the work piece;
FIG. 3 is another vertical section showing a second position of the depth control device upon the work piece.

As a specific embodiment of my invention, my new depth control device as shown in the drawings is designed to be attached to an engraving machine of the pantograph type, as shown in Green Patent No. 2,627,658, but it is understood that the device can be adapted to cutting machines and tools of other types, cutting on curved surfaces. In the drawings, the work piece shown is a spherical object, for example, a bowling ball. But cylindrical, conical, convex, concave, and inclined, and other essentially smooth curved surfaces may be engraved or cut equally effectively by using my depth control device.

In FIG. 1 of the drawings, belt 58 connects a vertically rotating spindle 55 to an electric motor (not shown). As the belt and spindle are of conventional type, they are not described in detail. Spindle mounting 30 holds the vertically rotating spindle 55, and arms 46 on the spindle mounting connect to the pantograph apparatus (not shown).

The outside of hollow spindle mounting 30 is threaded so as to engage interior threads on the cylindrical frame member or shoe 32 of the depth regulator (FIG. 2). The top portion of frame member or shoe 32 is of enlarged outside diameter and is knurled so that it may be secured tightly against knurled lock nut 34 on spindle mounting 30 (FIG. 3). The vertical height of shoe 32 on said spindle mounting 30 is adjustable so that more or less of the point of cutting tool 56 attached to spindle 55 protrudes through nose piece 36 as desired, and therefore the depth of engraving can be effectively regulated.

Shoe 32 is a hollow cylindrical frame member of steel or other suitable material, the lower end of which forms a socket 38 of reduced diameter (FIG. 2). The inner edge of said socket 38 (FIG. 3) is hemispherical in contour and receives nose piece 36 which is hemispherical in outer contour. Nose piece 36 has a central orifice 40 tapering outwardly through which cutting tool 56 protrudes, and said nose piece also has a flat bottom surface enclosed by the circumferential rib 42 which rests on the work piece 44. Said nose piece 36 is made of Alnico or other suitable magnetic material. Socket 38 and nose piece 36 of shoe 32 are firmly, yet movably, held together by mutual magnetic attraction. Nose piece 36 is pivotally movable in all directions in socket 38 so that it can follow the contour of work piece 44 (FIGS. 2 and 3) keeping the engraving made by cutter 56 at uniform depth.

It will be understood that my depth control device can be used for engraving on plane surfaces as well, but its particular advantage and value lies in its use on essentially smooth curved surfaces, such as convex, concave, and inclined surfaces, which present particular problems.

It will thus be seen that I have thus provided a depth control device for engraving on curved and inclined surfaces with standard engraving machines and other cutting tools, which provides a degree of control not possible in previous devices.

But as above stated, it will be understood that my device is not limited to use on a standard engraving machine on curved surfaces, but is useful on other cutting tools operating on curved surfaces such as convex, concave, and inclined surfaces, where depth control is desirable, such as die sinking machinery, milling machines, routing tools, and the like.

I claim:
1. In combination with a cutting machine of the type having a cutting tool mounted on a rotary spindle, a cutting-depth control device for cutting on work pieces having curved or inclined surfaces, comprising a hollow frame member secured to the spindle mounting of said cutting machine, the lower end of said member forming a socket, the inner edge of said socket being hemispherical in contour, and a nose piece hemispherical in outer contour universally rotatable in said socket, having a central orifice therein tapered inwardly and downwardly through which the cutting tool protrudes, said socket and nose piece being of magnetizable material and capable of being movably held together by magnetic attraction, the pivot point of said nose piece substantially coinciding with the intersection of the axis of rotation of said spindle and the surface of said workpiece.

2. A cutting-depth control device in accordance with claim 1 in which the nose piece has a circumferential rib on its bottom surface for engaging the work piece.

3. In combination with a cutting machine, a cutting-depth control device for cutting with a rotary cutting tool on work pieces having curved or inclined surfaces, comprising a hollow cylindrical frame member adjustably secured to the spindle mounting of said machine and enclosing said spindle, the lower end of said member forming a socket of reduced diameter, the inner edge of said socket being hemispherical in contour, and a nose piece hemispherical in outer contour universally rotatable in said socket and having a central orifice therein tapered inwardly and downwardly through which the cutting tool protrudes, said socket and nose piece being of magnetizable material and movably held together by magnetic attraction, the pivot point of said nose piece substantially coinciding with the intersection of the axis of rotation of said spindle and the surface of said workpiece.

4. A cutting-depth control device in accordance with claim 3 in which the nose piece has a circumferential rib on its bottom surface for engaging the work piece.

References Cited in the file of this patent

UNITED STATES PATENTS

| | | |
|---|---|---|
| 741,354 | Ott | Oct. 13, 1903 |
| 1,581,720 | Carter | Apr. 20, 1926 |
| 2,572,999 | Elliott | Oct. 30, 1952 |
| 2,740,330 | Watson | Apr. 3, 1956 |
| 2,831,260 | Shaw | Apr. 22, 1958 |